(12) United States Patent
Shih

(10) Patent No.: US 11,371,546 B2
(45) Date of Patent: Jun. 28, 2022

(54) SELF-DRILLING SCREW STRUCTURE

(71) Applicant: BI-MIRTH CORP., Kaohsiung (TW)

(72) Inventor: Yi-Chieh Shih, Kaohsiung (TW)

(73) Assignee: Bi-Mirth Corp., Kaohsiung (TW)

( * ) Notice: Subject to any disclaimer, the term of this patent is extended or adjusted under 35 U.S.C. 154(b) by 319 days.

(21) Appl. No.: 16/664,158

(22) Filed: Oct. 25, 2019

(65) Prior Publication Data
US 2021/0123469 A1 Apr. 29, 2021

(51) Int. Cl.
*F16B 25/10* (2006.01)
*F16B 25/00* (2006.01)

(52) U.S. Cl.
CPC ........ *F16B 25/103* (2013.01); *F16B 25/0052* (2013.01); *F16B 25/10* (2013.01)

(58) Field of Classification Search
CPC .. F16B 25/00; F16B 25/0052; F16B 25/0078; F16B 25/0084; F16B 25/103; F16B 33/02; F16B 35/041; F16B 25/10
USPC ............ 411/386, 387.1, 387.5, 387.6, 387.7, 411/387.8, 411, 421, 424
See application file for complete search history.

(56) References Cited

U.S. PATENT DOCUMENTS

| | | | | |
|---|---|---|---|---|
| 2,232,336 | A * | 2/1941 | Meersteiner | F16B 25/0021 411/421 |
| 6,142,719 | A * | 11/2000 | Daubinger | F16B 25/0021 411/387.1 |
| 9,322,422 | B2 | 4/2016 | Park | |
| 2001/0014262 | A1 * | 8/2001 | Friederich | C21D 6/02 411/386 |
| 2008/0124188 | A1 * | 5/2008 | Chang | F16B 25/0026 411/387.8 |
| 2009/0214321 | A1 * | 8/2009 | Wang | B21K 5/04 411/387.6 |
| 2009/0232619 | A1 * | 9/2009 | Baumgartner | F16B 25/103 411/387.8 |
| 2010/0119327 | A1 * | 5/2010 | Lin | F16B 25/103 411/387.8 |
| 2014/0023455 | A1 * | 1/2014 | Park | F16B 25/0057 411/387.7 |
| 2015/0316088 | A1 * | 11/2015 | Pearce | F16B 25/103 411/387.7 |
| 2018/0209466 | A1 * | 7/2018 | Chao | F16B 25/0084 |

(Continued)

FOREIGN PATENT DOCUMENTS

TW          M558305 U          4/2018

*Primary Examiner* — Roberta S Delisle
(74) *Attorney, Agent, or Firm* — Muncy, Geissler, Olds & Lowe, P.C.

(57) ABSTRACT

A self-drilling screw structure comprises a screw head and a screw rod extending outwardly from the screw head. The screw rod is formed with a drill bit section at one end opposite to the screw head, a drill tail section and a screw thread section. The drill bit section comprises two first cutting edges extending helically and intersecting at a chisel edge. Two first chip flutes located at the positions respectively between the two first cutting edges and extending from the chisel edge toward the drill tail section. The drill tail section comprises two second cutting edges extending helically toward the screw thread section. Two second chip flutes located at the positions respectively between the two second cutting edges and extending helically toward the screw thread section. Each first chip flute and the second chip flute form a connection at joint between the drill bit and drill tail sections.

6 Claims, 7 Drawing Sheets

(56) References Cited

U.S. PATENT DOCUMENTS

2019/0219091 A1* 7/2019 Lin .................... F16B 25/0052
2020/0240453 A1* 7/2020 Priess .................. F16B 25/103

* cited by examiner

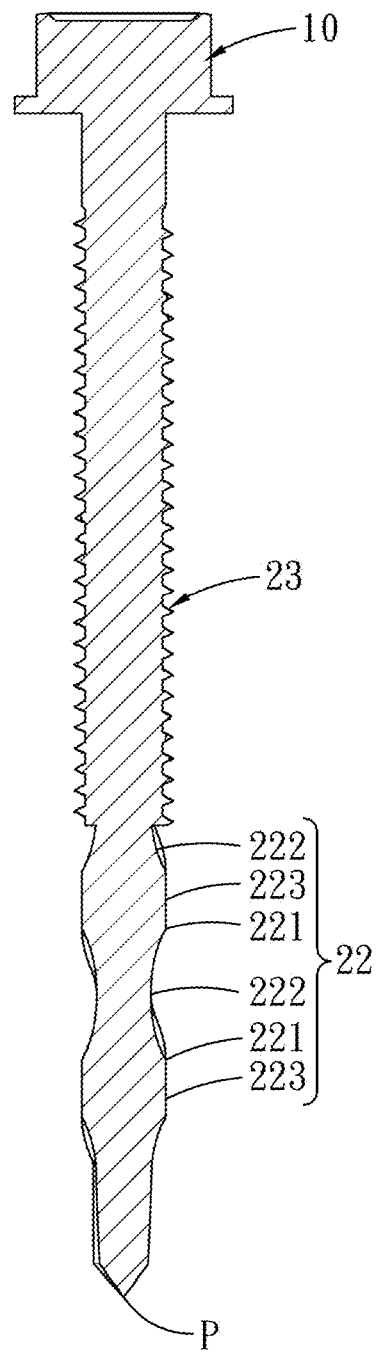
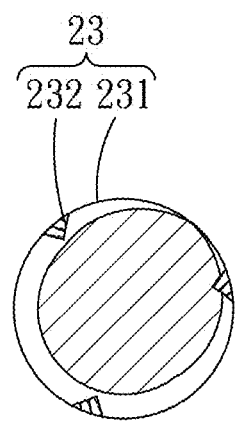
Fig.4C
Fig.4D

SELF-DRILLING SCREW STRUCTURE

FIELD OF THE INVENTION

The present invention relates to a fastener, and more particularly to a self-drilling screw which comprises two chip flutes at different positions and mutually communicated for quick chip removal.

BACKGROUND OF THE INVENTION

Please refer to FIG. 1 of Taiwan utility model patent no. M 558305, which is a existing self-drilling screw structure 1 mentioned in U.S. Pat. No. 9,322,422 B2, and the self-drilling screw structure 1 comprises a screw head 11, a rod body 12 extending from the screw head 11 along an axis Z, a drill tail 13 integrally connected to the rod body 12 and disposed at one end opposite to the screw head 11, a screw thread 14 formed on the rod body 12 and extending helically with a distance from the screw head 11 along the axis Z, and a chip flute 15 formed on the rod body 12 between the screw thread 14 and the drill tail 13. Further, the chip flute 15 is helically disposed around the rod body 12 and surrounds the rod body 12 at least one turn. When the drill tail 13 of the self-drilling screw 1 is used for drilling, chips generated from cutting a workpiece are discharged through the chip flute 15.

However, when the chip flute 15 concavely disposed on the drill tail 13 of the rod body 12 is manufactured, the chip flute 15 on the rod body 12 fails to completely communicate with the chip flute (not labeled) of the screw thread 14 or the chip flute (not labeled) of the drill tail 13 due to the alignment problem. Thus, when the drill tail 13 cuts the workpiece, chips generated from cutting the workpiece by the drill tail 13 cannot be smoothly discharged through the chip flute 15 since the chip flute of the drill tail 13 does not communicate with the chip flute 15, causing a drawback that the generated chips are blocked on the chip flute of the drill tail 13 or the chip flute 15 of the rod body 12. When the chip flute 15 is unable to perform the chip removing function, it is necessary to apply a greater rotational force to drive the drill tail 13 to continue drilling and cutting the workpiece, and thus a blade portion of the drill tail 13 must withstand a greater external force, causing the drill tail 13 to wear down quickly. In view of the above-mentioned problems, a self-drilling screw structure is provided for solving the above-mentioned problems, and a self-drilling screw is disposed with two chip flutes to communicate with different positions of the self-drilling screw. Therefore, the problem that the two chip flutes not communicating with each other due to the lack of process accuracy will not occur during manufacturing of the two chip flutes, in order to overcome the drawback of the prior art.

SUMMARY OF THE INVENTION

An object of the present invention is to solve the problem that the conventional self-drilling screw of the prior art described above cannot effectively discharge chips along with the chip flute of the rod body smoothly from the chip flute of the drill bit when cutting a workpiece.

In order to achieve the above object, the present invention provides a self-drilling screw structure, comprising a screw head and a screw rod extending outwardly from the screw head, the screw rod is formed with a drill bit section at one end opposite to the screw head, a drill tail section adjacent to the drill bit section, and a screw thread section adjacent to the drill tail section. The drill bit section is provided with at least two first cutting edges extending helically and intersecting at a chisel edge, and at least one first chip flute located at a position respectively between the first cutting edges and extending from the chisel edge toward the drill tail section, the drill tail section is provided with at least two second cutting edges extending helically toward the screw thread section, and at least one second chip flute located at a position respectively between the at least two second cutting edges and extending helically toward the screw thread section, and the screw thread section comprises a screw thread extending helically toward the screw head. Each first chip flute and the second chip flute form a connection at a joint between the drill bit section and the drill tail section.

Further, a first chip flute width of each the first chip flute is less than or equal to a second chip flute width of each second chip flute, and the first chip flute width is greater than or equal to one-half of a diameter of the screw rod.

Further, the second chip flute width of each second chip flute is tapered off toward the screw thread section.

Further, a difference between the second chip flute width of each second chip flute adjacent to the drill bit section and the second chip flute width of each second chip flute adjacent to the screw thread section is within 0.5 mm.

Further, the at least one first chip flute, the at least one second chip flute and the screw thread extend helically in a same direction.

Further, a first ridge is formed between the two first chip flutes, a second ridge is formed between the two second chip flutes, and a second ridge width is smaller than the second chip flute width and greater than zero.

Further, the screw thread of the screw thread section is formed with a plurality of chip discharge grooves arranged helically.

Therefore, the present invention has the following beneficial efficacies over the prior art:

1. The first chip flute of the drill bit section and the second chip flute of the drill tail section of the self-drilling screw structure form the connection at the joint, so that when the drill bit section cuts a workpiece, chips generated are discharged from the second chip flutes after passing through the connection from the first chip flutes, thereby relatively increasing the chip removal speed, so that drilling and cutting of the workpiece is performed more smoothly, and excellent locking force is produced through the screw thread of the screw thread section.

2. The second chip flute width of the second chip flute is greater than or equal to the first chip flute width of the first chip flute of the self-drilling screw structure, and therefore, after forming the first chip flute, when the second chip flute is formed, the first chip flute and the second chip flute at least partially overlap at the joint between the drill bit section and the drill tail section to form the connection.

BRIEF DESCRIPTION OF THE DRAWINGS

FIG. 4C is a cross-sectional view of line B-B of FIG. 4A;

FIG. 4D is a cross-sectional view of line C-C of FIG. 4A;

DETAILED DESCRIPTION OF THE PREFERRED EMBODIMENTS

Figure 1:
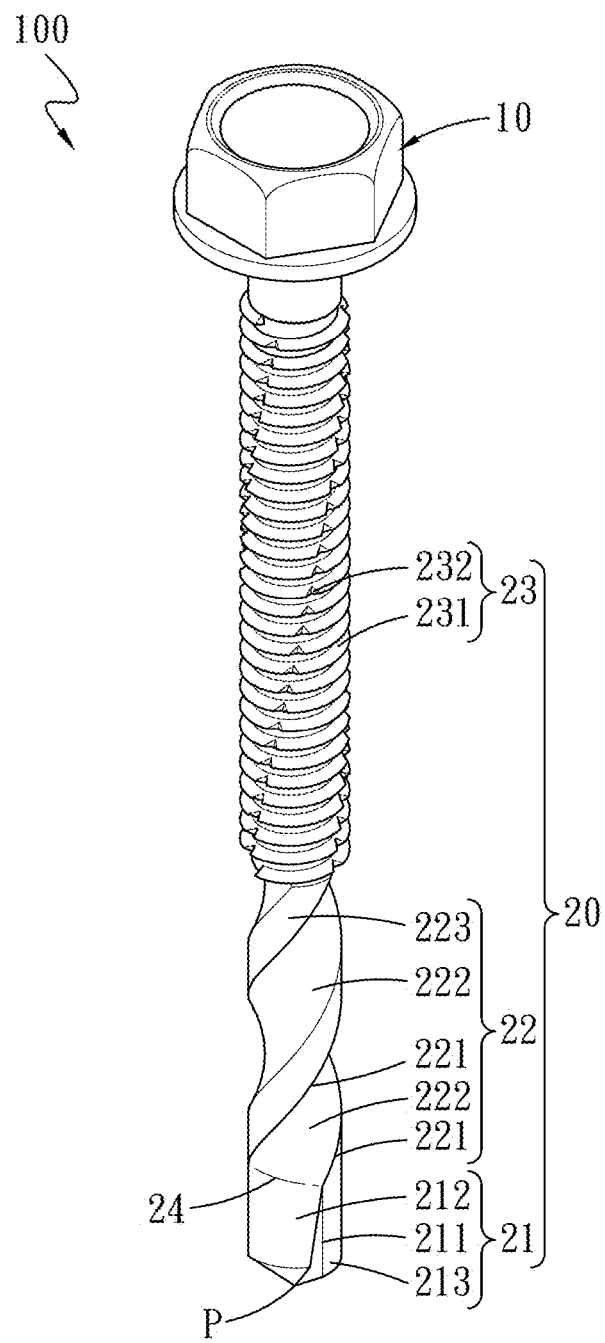
FIG. 1 is a perspective view of a self-drilling screw structure of the present invention.
Figure 2:
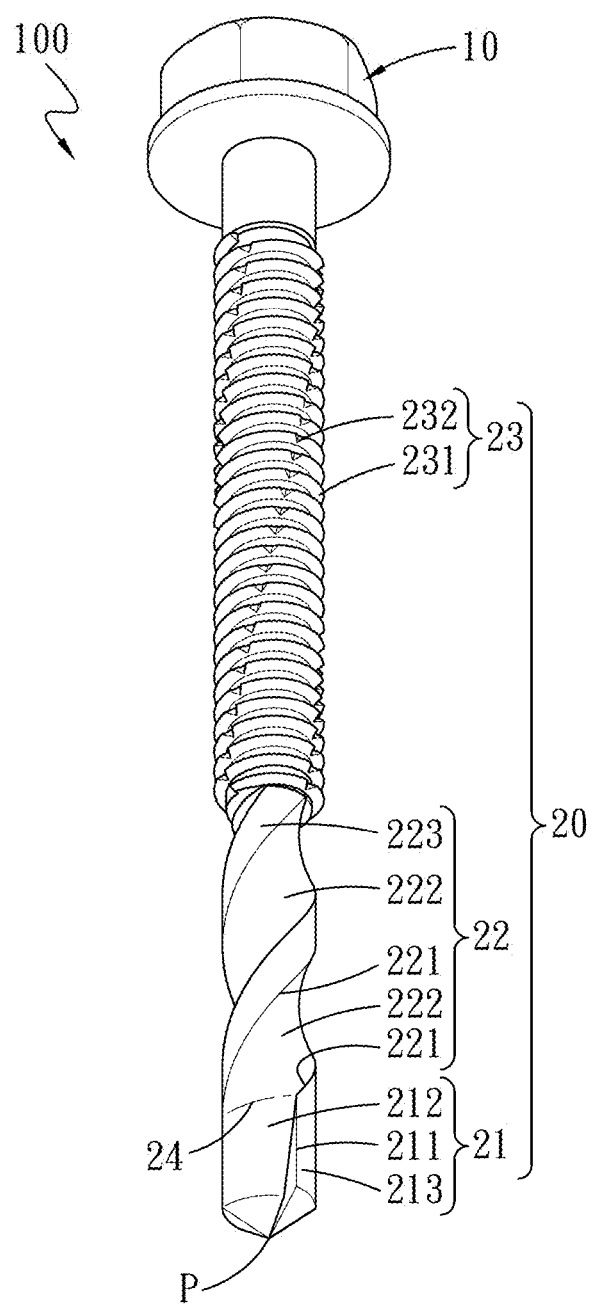
FIG. 2 is a perspective view of the self-drilling screw structure of the present invention viewed from another angle.
Figure 3:
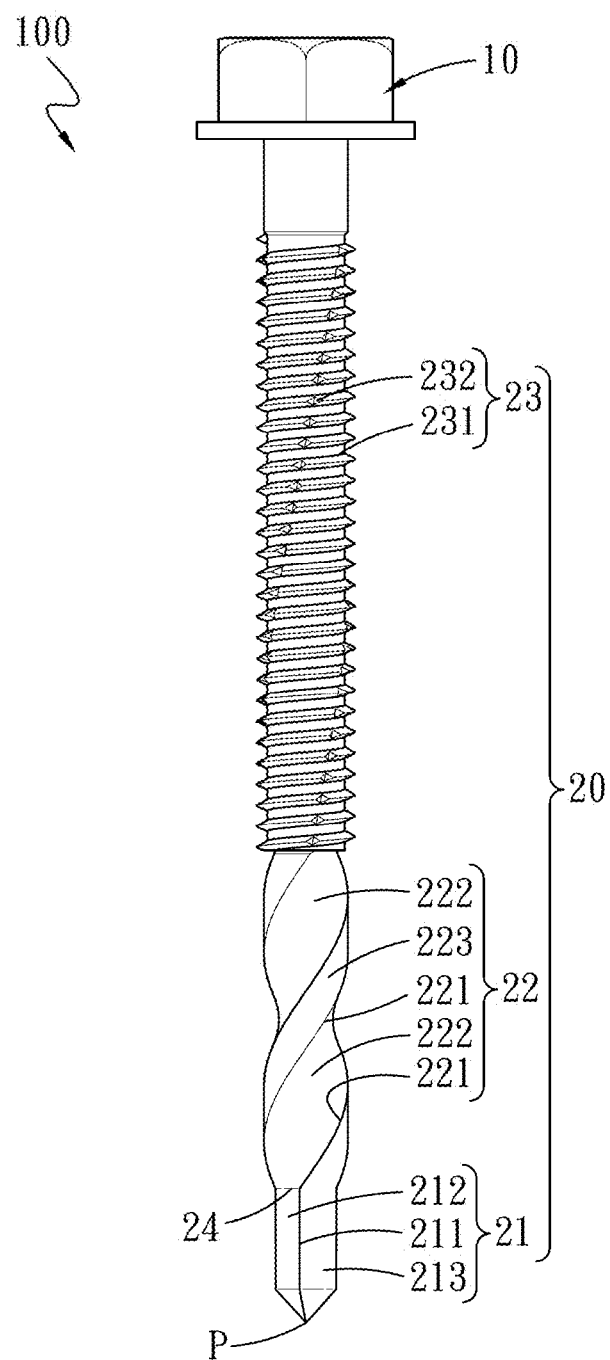
FIG. 3 is a front view of the self-drilling screw structure of the present invention.

The technical features and operation modes of the present application described in the following preferred embodiments in conjunction with the accompanying figures are provided as reference for examining. In addition, the figures in the present invention are not necessarily drawn according to actual scales in order to facilitate illustrating the proportions. The proportions in the figures are not intended to limit the scope of the requested claims.

For the content of the present invention, please refer to FIGS. 1, 2, 3, 4A, 4B, 4C, and 4D, which are a first embodiment of the present invention. The present invention provides a self-drilling screw structure 100, which mainly comprises a screw head 10, and a screw rod 20 extending outwardly from the screw head 10.

The screw rod 20 is formed with a drill bit section 21 at one end opposite to the screw head 10, a drill tail section 22 adjacent to the drill bit section 21, and a screw thread section 23 adjacent to the drill tail section 22, wherein the drill bit section 21 is provided with two first cutting edges 211 extending helically and intersecting at a chisel edge P, and two first chip flutes 212 located at the positions respectively between the two first cutting edges 211 and extending from the chisel edge P toward the drill tail section 22. That is, the first chip flute 212 is concavely formed between the two first cutting edges 211, and a first ridge 213 is formed at a position where the first chip flute 212 and the first cutting edge 211 are not formed. Furthermore, the drill tail section 22 is provided with two second cutting edges 221 extending helically toward the screw thread section 23, and two second chip flutes 222 located at the positions respectively between the two second cutting edges 221 and extending helically toward the screw thread section 23. Similarly, the second chip flute 222 is concavely formed between the two second cutting edges 221, and a second ridge 223 is formed at a position where the second chip flute 222 and the second cutting edge 221 are not formed, and the second ridge 223 has a second ridge width D4. In the first embodiment, two first cutting edges 211 and two second cutting edges 221 are respectively provided, one first chip flute 212 is disposed between the two first cutting edges 211, and one second chip flute 222 is disposed between the two second cutting edges 221; but are not limited thereto, a quantity of the first cutting edge 211, the second cutting edge 221, the first chip flute 212 and the second chip flute 222 can also be provided with three or more. In addition, please refer to FIG. 3, FIG. 4A and FIG. 4D, the screw thread section 23 comprises a screw thread 231 extending helically toward the screw head 10, and the screw thread 231 is formed with a plurality of chip discharge grooves 232 which are arranged helically. Each of the plurality of first chip flutes 212 and the second chip flute 222 form a connection 24 at a joint between the drill bit section 21 and the drill tail section 22, and each of the plurality of connections 24 can be further provided with a rib (not shown in the figures). Moreover, the connection 24 is not necessarily formed at the joint between the drill bit section 21 and the drill tail section 22, and may be formed at the drill tail section 22, thereby the plurality of first chip flutes 212 communicate with the plurality of corresponding second chip flutes 222.

More specifically, please refer to FIG. 3, FIG. 4A, FIG. 4B and FIG. 4C, a first chip flute width D1 of each of the plurality of first chip flutes 212 is less than or equal to a second chip flute width D2 of each of the plurality of second chip flutes 222, and the first chip flute width is greater than or equal to one-half of a diameter D3 of the screw rod 20, thereby the second chip flute width D2 of the second chip flute 222 is greater than or equal to the first chip flute width D1 of the first chip flute 212 of the self-drilling screw structure 100. Therefore, after forming the first chip flute 212, when the second chip flute 222 is formed, each of the plurality of first chip flutes 212 and each of the plurality of second chip flutes 222 at least partially overlap at the joint between the drill bit section 21 and the drill tail section 22 to form the connection 24. In the first embodiment, the first chip flute width D1 is equal to the second chip flute width D2, and the first chip flute width D1 and the second chip flute width D2 are completely overlapped at the joint, but are not limited thereto. The connection 24 is able to be formed on the first chip flute 212, thus the connection 24 of the first embodiment is formed at the joint, and the first chip flute 212 and the second chip flute 222 overlap at the joint. Therefore, a width of the connection 24 is equivalent to the first chip flute width D1 and the second chip flute width D2, thereby preventing the plurality of first chip flutes 212 and the plurality of corresponding second chip flutes 222 from being completely non-overlapping in manufacturing, and the condition that the connection 24 is not formed is avoided. Furthermore, the plurality of first chip flutes 212, the plurality of second chip flutes 222, and the screw thread 231 extend helically in a same direction. The second ridge width D4 is smaller than the second chip flute width D2 and greater than zero, and the second chip flutes 222 are substantially arc-shaped, but are not limited thereto.

Figure 4A:
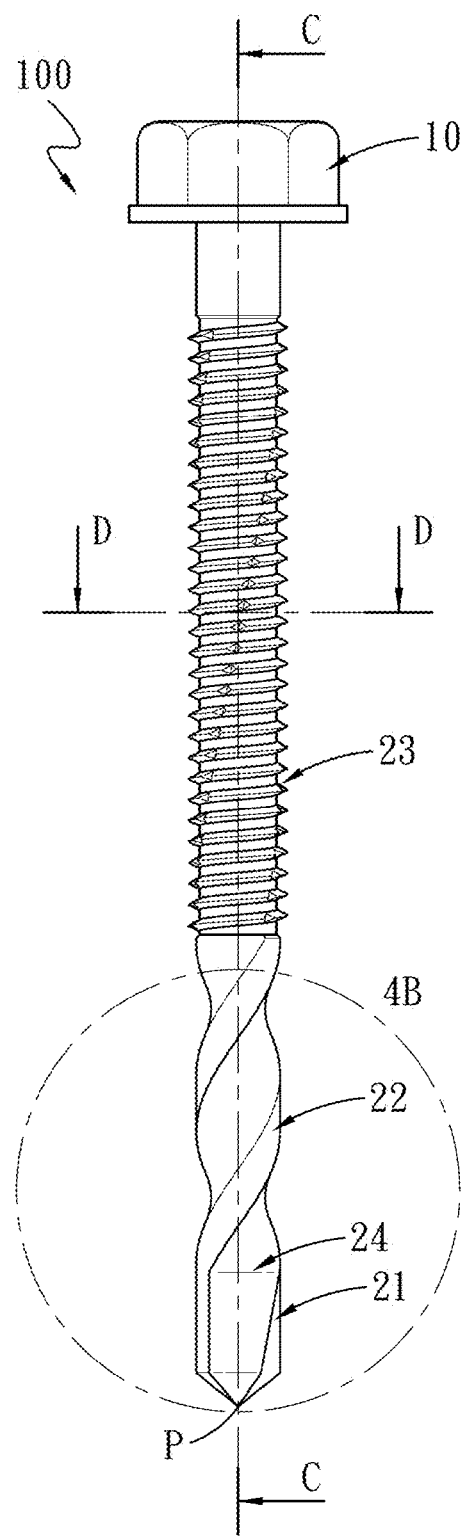
FIG. 4A is a front view of the self-drilling screw structure of the present invention viewed from another angle.
Figure 4B:
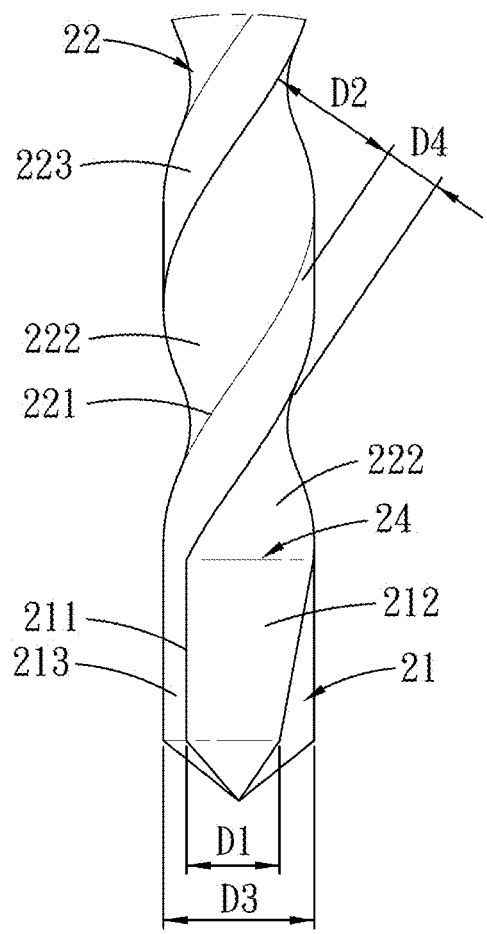
FIG. 4B is a partial enlarged view of part A indicated in FIG. 4A.
Figure 5:
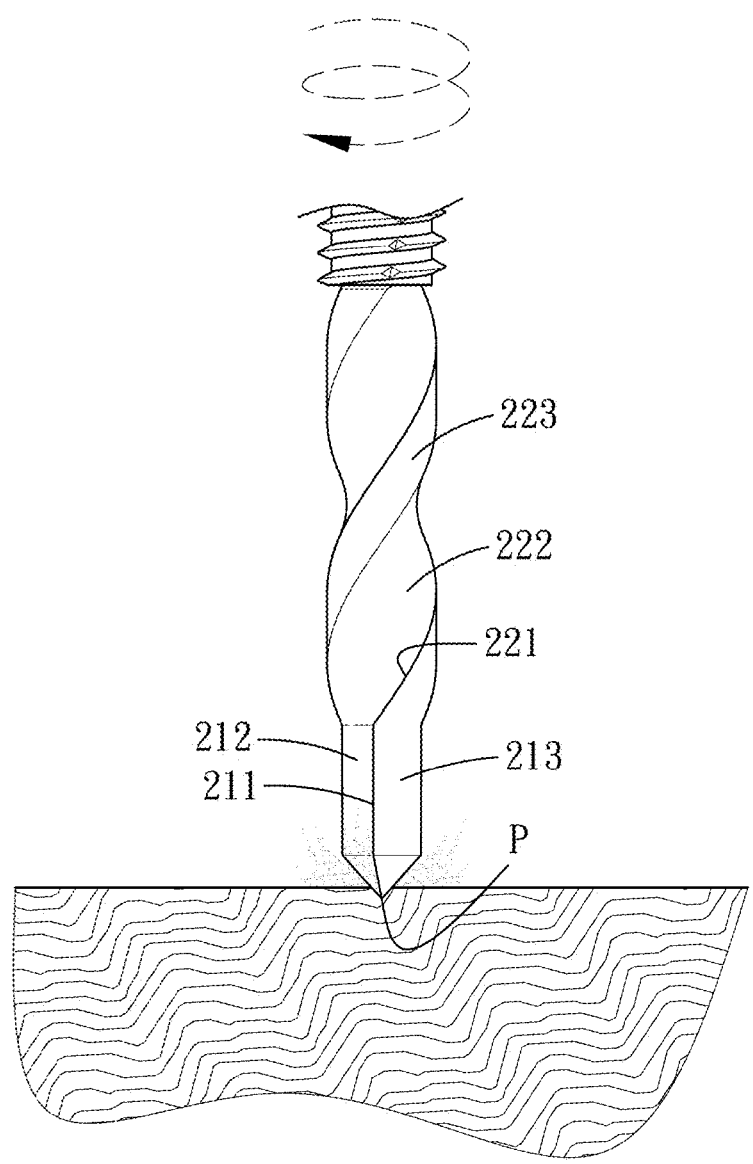
FIG. 5 is a schematic view of the action of chip removal of a drill bit section of the self-drilling screw structure of the present invention.
Figure 6:
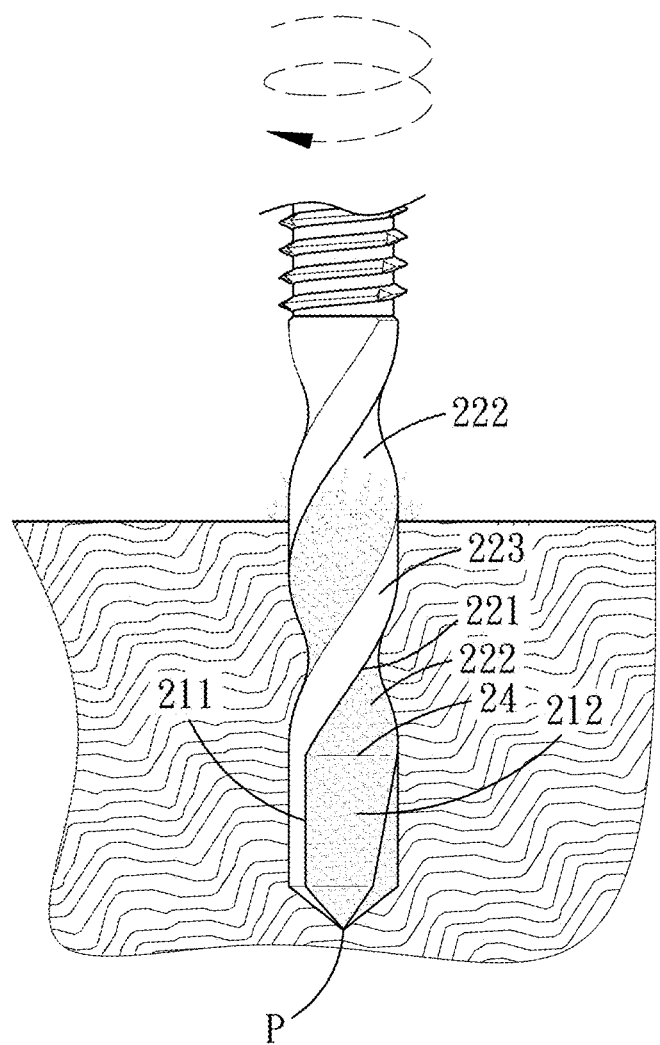
FIG. 6 is a schematic view of the action of chip removal of a drill tail section of the self-drilling screw structure of the present invention.

Please refer to FIG. 4A, FIG. 5 and FIG. 6, when a user uses the self-drilling screw structure 100 to cut into a workpiece, the chisel edge P is at a point where the workpiece is expected to be drilled, and when the drill bit section 21 is drilled into the workpiece, chips generated by cutting the workpiece with the first cutting edge 211 are discharged from the first chip flutes 212 toward the drill tail section 22. Further, if the connection 24 is formed with the rib (not shown in the figures), the chips are further cut apart by the rib when the chips pass through the connection 24. Please refer to FIG. 4B and FIG. 6, after the drill tail section 22 is drilled into the workpiece, the chips will pass through the connection 24, and continue to be discharged outwardly through the second chip flute 222. Further, the first chip flute width D1 of each of the plurality of first chip flutes 212 is less than or equal to the second chip flute width D2 of each of the plurality of second chip flutes 222, and the plurality of first chip flutes 212 and the plurality of second chip flutes 222 extend helically in a same direction. Thus, during the manufacturing process of the self-drilling screw structure 100, each of the plurality of first chip flutes 212 and the plurality of corresponding second chip flutes 222 forms the communicated connection 24 at the joint or near the joint of the drill bit section 21 and the drill tail section 22. In this way, the chips generated during cutting are discharged from the second chip flute 222 after passing through the connection 24 from the first chip flute 212, and the problem of blocking caused by the second chip flute 222 and the first chip flute 212 being unable to form the connection 24 will not occur.

Moreover, the second chip flute width D2 of each of the plurality of second chip flutes 222 is tapered off toward the screw thread section 23. That is, a difference between the second chip flute width D2 of the plurality of second chip flute 222 of each of plurality of the second chip flutes 222 adjacent to the drill bit section 21 and the second chip flute width D2 of the second chip flute 222 of each of the plurality of second chip flutes 222 adjacent to the screw thread section 23 is within 0.5 mm (not shown in the figures). Thereby, when the chips of the first chip flute 212 enter the second chip flute 222 from the connection 24, the chips will not be piled up at the connection 24, and the second chip flute 222 includes an expanding design for the first chip flute 212 at the connection 24, so that the chips are quickly discharged from the second chip flute 222.

In summary, with the design of the first chip flute 212 and the second chip flute 222 forming the connection 24 at the joint between the drill bit section 21 and the drill tail section 22, the self-drilling screw structure 100 of the present invention ensures that the chips generated during cutting the workpiece can be discharged quickly from the second chip flute 222 after passing through the connection 24 from the first chip flute 212. In the manufacturing process, the first chip flute 212 and the second chip flute 222 form the connection 24, which contributes to the increase of production yield and effectively improves the smoothness of drilling and locking, so that the problems in the prior art is solved.

What is claimed is:

1. A self-drilling screw structure, comprising:
a screw head; and
a screw rod extending outwardly from the screw head, the screw rod formed with a drill bit section at one end opposite to the screw head, a drill tail section adjacent to the drill bit section, and a screw thread section adjacent to the drill tail section, wherein the drill bit section is provided with at least two first cutting edges extending helically and intersecting at a chisel edge, and at least one first chip flute located at a position respectively between the first cutting edges and extending from the chisel edge toward the drill tail section, the drill tail section is provided with at least two second cutting edges extending helically toward the screw thread section, and at least one second chip flute located at a position respectively between the at least two second cutting edges and extending helically toward the screw thread section, and the screw thread section comprises a screw thread extending helically toward the screw head;
wherein each first chip flute and the second chip flute form a connection at a joint between the drill bit section and the drill tail section; and
wherein a first chip flute width of each first chip flute is less than or equal to a second chip flute width of each second chip flute, and the first chip flute width is greater than or equal to one-half of a diameter of the screw rod.

2. The self-drilling screw structure as claimed in claim 1, wherein the second chip flute width of each second chip flute is tapered off toward the screw thread section.

3. The self-drilling screw structure as claimed in claim 2, wherein a difference between the second chip flute width of each second chip flute adjacent to the drill bit section and the second chip flute width of each second chip flute adjacent to the screw thread section is within 0.5 mm.

4. The self-drilling screw structure as claimed in claim 1, wherein a first ridge is formed between two first chip flutes, a second ridge is formed between two second chip flutes, the second ridge has a second ridge width, and the second ridge width is smaller than the second chip flute width and greater than zero.

5. The self-drilling screw structure as claimed in claim 1, wherein the at least one first chip flute, the at least one second chip flute and the screw thread extend helically in a same direction.

6. The self-drilling screw structure as claimed in claim 1, wherein the screw thread of the screw thread section is formed with a plurality of chip discharge grooves arranged helically.

* * * * *